United States Patent
Nakayama et al.

(10) Patent No.: US 8,961,664 B2
(45) Date of Patent: Feb. 24, 2015

(54) CARBON DIOXIDE RECOVERY DEVICE

(71) Applicant: Mitsubishi Heavy Industries, Ltd., Tokyo (JP)

(72) Inventors: Koji Nakayama, New York, NY (US); Takahito Yonekawa, New York, NY (US); Masayuki Inui, New York, NY (US); Tatsuya Tsujiuchi, New York, NY (US); Yoshiki Sorimachi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 108 days.

(21) Appl. No.: 13/623,495

(22) Filed: Sep. 20, 2012

(65) Prior Publication Data

US 2014/0076166 A1 Mar. 20, 2014

(51) Int. Cl.
*B01D 53/14* (2006.01)
*F23J 15/04* (2006.01)

(52) U.S. Cl.
CPC ........ *B01D 53/1475* (2013.01); *B01D 53/1418* (2013.01); *F23J 15/04* (2013.01); *B01D 2252/20478* (2013.01); *B01D 2258/0283* (2013.01); *Y02C 10/06* (2013.01); *F23J 2215/50* (2013.01); *F23J 2219/40* (2013.01)
USPC ................... 96/234; 95/183; 95/193; 95/204; 95/209; 95/236

(58) Field of Classification Search
None
See application file for complete search history.

(56) References Cited

U.S. PATENT DOCUMENTS 3,438,734 A * 4/1969 Grantham .................. 423/578.2

FOREIGN PATENT DOCUMENTS

| JP | 5-184866 A | 7/1993 |
|---|---|---|
| JP | 5-184867 A | 7/1993 |
| JP | 2010-207686 A | 9/2010 |
| JP | 2011-521774 A | 7/2011 |
| JP | 2011-218287 A | 11/2011 |
| WO | 2011/080838 A1 | 7/2011 |
| WO | 2011/084254 A1 | 7/2011 |
| WO | 2011/120754 A2 | 10/2011 |

OTHER PUBLICATIONS

International Search Report of PCT/JP2013/074767, mailing date of Dec. 10, 2013, w/English translation.
Written Opinion of PCT/JP2013/074767, mailing date of Dec. 10, 2013, w/English translation.
Notification of Transmittal of the International Search Report and the Written Opinion of the International Search Authority (form PCT/ISA/220) of PCT/JP2013/074767, mailing date of Dec. 10, 2013.
Iijima A. et al., "Large-scale Carbon Dioxide Capture Demonstration Project at a Coal-fired Power Plant in the USA", Mitsubishi Heavy Industries Technical Review, vol. 49, No. 1, Mar. (2012), pp. 42-47, w/English translation.

* cited by examiner

*Primary Examiner* — Duane Smith
*Assistant Examiner* — Pankti Patel
(74) *Attorney, Agent, or Firm* — Westerman, Hattori, Daniels & Adrian, LLP (57) ABSTRACT

A carbon dioxide recovery unit is provided with: an absorption tower for bringing an exhaust gas into contact with a $CO_2$ absorbing liquid to thereby absorb and recover $CO_2$ from the exhaust gas; a regeneration tower for taking out the $CO_2$ from the $CO_2$ absorbing liquid; a $CO_2$ delivery line $L_3$ for delivering the taken-out $CO_2$ to a storage process; and a $CO_2$ return line $L_5$ for returning the taken-out $CO_2$ to the absorption tower. When a $CO_2$ recovery unit and a $CO_2$ compressing device are activated, if a storage process side has some kind of trouble and cannot receive the $CO_2$, a destination part to which the $CO_2$ is delivered from the regeneration tower is switched from the $CO_2$ delivery line $L_3$ to the $CO_2$ return line $L_5$, whereby the $CO_2$ gas is mixed with the exhaust gas in the absorption tower.

5 Claims, 4 Drawing Sheets

CARBON DIOXIDE RECOVERY DEVICE

TECHNICAL FIELD

The present invention relates to a carbon dioxide recovery unit for recovering carbon dioxide ($CO_2$) from exhaust gas produced in a thermal power plant or the like, for example, by an apparatus provided with a boiler, a turbine, and the like.

BACKGROUND ART

In order to reduce global warming, it is desired to reduce the evolution of $CO_2$. Also a thermal power plant or the like including an apparatus provided with a boiler, a gas turbine, and the like for burning fuel is strongly required to reduce the amount of emission of $CO_2$ contained in an exhaust gas evolved when the apparatus is operated.

In order to reduce the amount of emission of $CO_2$ in the apparatus like this, a method is used in which $CO_2$ contained by the exhaust gas is absorbed by bringing the exhaust gas from the boiler, the gas turbine, and the like for burning fuel into contact with an amine-based absorbing liquid (hereinafter referred to as "$CO_2$ absorbing liquid") (see, for example, PTL 1.).

In addition, in recent years a method has been studied for recovering $CO_2$ from a $CO_2$ absorbing liquid after absorbing $CO_2$ from the exhaust gas and for storing the recovered $CO_2$ in the ground or the like (see, for example, PTL 2 and NPL 1).

Figure 4:
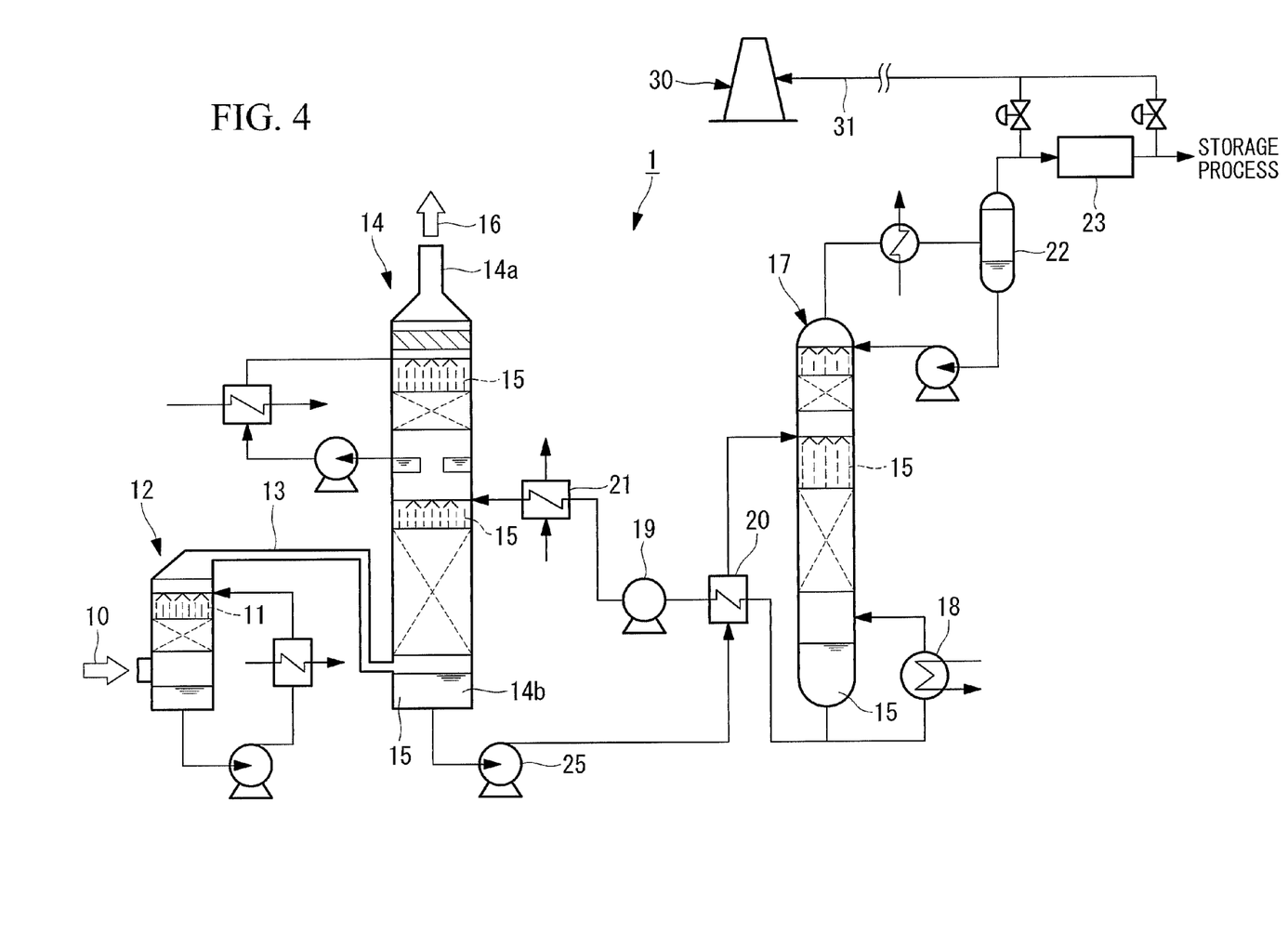
FIG. 4 is an illustration to show a construction of a $CO_2$ recovery unit of a related art.

FIG. 4 shows a construction of a $CO_2$ recovery unit 1.

In the $CO_2$ recovery unit 1, for example, an exhaust gas 10, which is exhausted from an apparatus such as a boiler and a turbine and contains $CO_2$, is supplied to a cooling tower 12 by a blower (not shown). The exhaust gas 10 supplied to the cooling tower 12 is cooled by a cooling water 11 in the cooling tower 12.

The exhaust gas 10, which contains $CO_2$ and is cooled, is supplied to a lower portion of an absorption tower 14 via an exhaust gas line 13. In the absorption tower 14, a $CO_2$ absorbing liquid 15 having alkanolamine as a base component (amine solution) is brought into countercurrent contact with the exhaust gas 10. In this way, the $CO_2$ in the exhaust gas 10 is absorbed by the $CO_2$ absorbing liquid 15 and the $CO_2$ is removed from the exhaust gas 10 exhausted from the industrial apparatus. A cleaned gas 16 in which $CO_2$ is removed is exhausted from a tower top portion 14a of the absorption tower 14.

The $CO_2$ absorbing liquid 15 having absorbed the $CO_2$ in the absorption tower 14 is stored in a tower bottom portion 14b and is fed to a regeneration tower 17 by a pump 25.

The $CO_2$ absorbing liquid 15 having absorbed the $CO_2$ (rich solution) is heated by steam generated by a reboiler 18 in the regeneration tower 17 and hence has the $CO_2$ emitted therefrom, thereby being regenerated as a $CO_2$ absorbing liquid 15 (lean solution) which is able to absorb $CO_2$. The $CO_2$ absorbing liquid 15 regenerated in this way is supplied again to the absorption tower 14 by a pump 19 via a heat exchanger 20 and a lean solution cooling device 21 and is reused.

The $CO_2$ emitted from the $CO_2$ absorbing liquid 15 in the regeneration tower 17 is fed to a $CO_2$ compressing device 23 through a gas-liquid separator 22 and is compressed there and then is fed to a storage process.

By the way, just after activating the $CO_2$ recovery unit 1 or the $CO_2$ compressing device 23 or because of the conditions of a storage process side, the recovered carbon dioxide gas cannot be fed to the storage process in some cases. In these cases, the recovered carbon dioxide gas is vented into the atmosphere from a vent stack 30.

CITATION LIST

Patent Literature

{PTL 1}
Japanese Unexamined Patent Application, Publication No. Hei 5-184866
{PTL 2}
Japanese Unexamined Patent Application, Publication No. 2011-218287

Non Patent Literature

{NPL 1}
Masaki Iijima and 4 others, "Large Scale Demonstration Project for Carbon Capture from Coal-fired Power Plant in U.S.A.", Mitsumishi Heavy Industries Technical Review, Vol. 49, No. 1 (2012), p. 42-47

SUMMARY OF INVENTION

Technical Problem

However, the vent stack 30 diffuses the $CO_2$ into the atmosphere and hence needs to be installed in a place in which people do not live around and at a height of several tens of meters. Hence, the vent stack 30 becomes very large and the installation of the vent stack 30 requires a large area in a place separate from the $CO_2$ recovery unit 1. In addition, there is required also a duct 31 for feeding a recovered carbon dioxide from the $CO_2$ recovery unit 1 to the vent stack 30. Hence, there is presented a problem that although the vent stack 30 is not always used during the operation, the vent stack 30 is high in installation cost and operation cost.

The present invention has been made in view of these circumstances, and an object of the present invention is to provide a carbon dioxide recovery unit which can be operated without using a vent stack and which can reduce cost.

Solution to Problem

In order to solve the problem described above, a carbon dioxide recovery unit of the present invention employs the following solutions.

That is, the carbon dioxide recovery unit of the present invention includes: an absorption tower for bringing a $CO_2$ absorbing liquid of absorbing $CO_2$ into contact with an exhaust gas exhausted from a facility for burning fuel to thereby absorb the $CO_2$ contained in the exhaust gas; a regeneration tower for emitting the $CO_2$ from the $CO_2$ absorbing liquid having absorbed the $CO_2$ in the absorption tower and for regenerating the $CO_2$ absorbing liquid; a delivery pipe for delivering the $CO_2$ emitted in the regeneration tower to the outside; a return pipe for feeding the $CO_2$ emitted in the regeneration tower to the absorption tower to thereby mix the $CO_2$ with a clean gas made by removing the $CO_2$ from the exhaust gas; and a switching part for switching a destination part to which the $CO_2$ is delivered from the regeneration tower.

In the carbon dioxide recovery unit like this, the $CO_2$ absorbed by the $CO_2$ absorbing liquid from the exhaust gas in the absorption tower is emitted from the $CO_2$ absorbing liquid in the regeneration tower. At the time of an ordinary operation, the $CO_2$ emitted in the regeneration tower is delivered to the outside from the delivery pipe. In the case where the $CO_2$ cannot be delivered to the outside because of some cause or other, the $CO_2$ emitted in the regeneration tower is fed by the switching part to the absorption tower through the return pipe. Then, the $CO_2$ emitted in the regeneration tower is mixed with the exhaust gas in the absorption tower and is delivered into the atmosphere together with the exhaust gas. This can eliminate the need for installing a vent stack.

At this time, since the $CO_2$ gas is mixed with the exhaust gas, when compared to a case where only the $CO_2$ gas is delivered, the mixed gas of the $CO_2$ gas and the exhaust gas is smaller in specific gravity and hence is increased in diffusibility.

Here, when the pressure of the $CO_2$ in the delivery pipe is a specified level or more, the switching part can switch a destination part, to which the $CO_2$ is delivered from the regeneration tower, from the delivery pipe to the return pipe.

Further, when the carbon dioxide recovery unit is activated, the switching part can get an operational situation and the like of a destination part to which the recovered $CO_2$ is delivered from information other than the pressure of the $CO_2$, for example, information showing an operational mode and the like and can also switch a destination part to which the $CO_2$ is delivered from the regeneration tower according to a result gotten from the operational situation and the like.

The return pipe may feed the $CO_2$ emitted in the regeneration tower into the absorption tower at any position on a downstream side in the direction of flow of the exhaust gas to a region in which the $CO_2$ absorbing liquid is brought into contact with the exhaust gas in the absorption tower. However, it is preferable that the return pipe feeds the $CO_2$ emitted in the regeneration tower into the absorption tower on an upstream side in the direction of flow of the clean gas to a region in which the clean gas is cleaned and cooled. This can elongate a contact region (contact time) in which the $CO_2$ is in contact with the exhaust gas and hence can well mix the $CO_2$ with the exhaust gas.

Further, the return pipe can feed the $CO_2$ emitted in the regeneration tower into a cooling water for cleaning and cooling the clean gas.

For this operation, it is preferable that the $CO_2$ emitted in the regeneration tower is fed into a recovery tank for recovering the cooling water so as to circulate the cooling water in the absorption tower.

In this way, in the case where an alkali solution such as an amine solution is used for the $CO_2$ absorbing liquid, a carbonated water acquired by blowing $CO_2$ gas into the cooling water and hence the pH of the cooling water is decreased to capture an alkali amine vapor or mist of the $CO_2$ absorbing liquid more effectively. Then, in the case where the a part of the $CO_2$ absorbing liquid is emitted into the atmosphere together with the exhaust gas, an emission reducing effect can be produced.

Still further, an upper portion of an opening portion of the absorption tower having an end portion of the return pipe connected thereto can be also provided with a cover protruding inward of the absorption tower in order to prevent a cooling water from flowing into the return pipe from the opening portion, the cooling water flowing down from above in the absorption tower.

A lower portion of the opening portion of the absorption tower having the end portion of the return pipe connected thereto can be also provided with a baffle plate for blocking a part of the lower portion of the opening portion in order to prevent the cooling water in the absorption tower from flowing into the return pipe from the opening portion.

In addition, the return pipe can be also provided with a drain trap for recovering a liquid component contained in the $CO_2$ fed from the regeneration tower and the cooling water flowing into the return pipe from the absorption tower.

Advantageous Effects of Invention

According to the present invention, at the time of the ordinary operation, the $CO_2$ recovered from the exhaust gas is delivered to the outside from the delivery pipe, and in the case where the $CO_2$ cannot be delivered to the outside because of some cause or other, the $CO_2$ is returned to the absorption tower and is mixed with the exhaust gas and then is emitted into the atmosphere. This can eliminate the need for installing a vent stack and hence can reduce an installation cost and an operation cost.

DESCRIPTION OF EMBODIMENTS

Hereinafter, a plurality of embodiments of a carbon dioxide recovery unit of the present invention will be described by the use of FIG. 1.

First Embodiment

Figure 1:
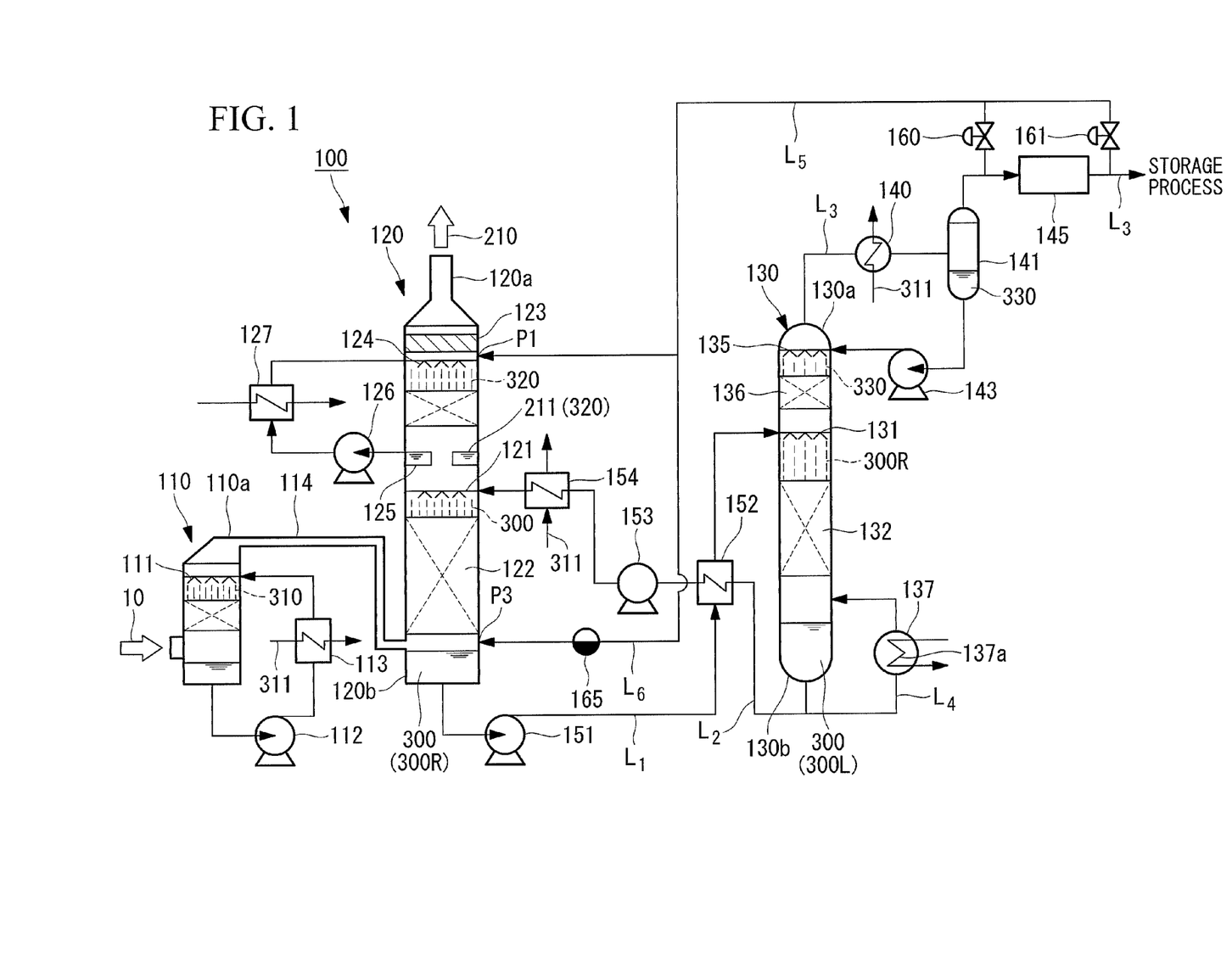
FIG. 1 is an illustration to show a construction of a $CO_2$ recovery unit relating to a first embodiment of the present invention.

As shown in FIG. 1, a $CO_2$ recovery unit 100 is provided with a cooling tower 110 for cooling an exhaust gas 10, an absorption tower 120 for absorbing and recovering $CO_2$ from the exhaust gas 10 by a $CO_2$ absorbing liquid 300, and a regeneration tower 130 for taking out the $CO_2$ from the $CO_2$ absorbing liquid 300 having absorbed the $CO_2$ and for regenerating the $CO_2$ absorbing liquid 300.

In this $CO_2$ recovery unit 100, the exhaust gas 10 containing $CO_2$ exhausted from an industrial facility, for example, a boiler and a gas turbine is supplied to the cooling tower 110 by a blower (not shown).

The exhaust gas 10 supplied to the cooling tower 110 is cooled by a cooling water 310 sprayed into the cooling tower 110 from nozzles 111. The cooling water 310 used for cooling the exhaust gas 10 is sent to and cooled by a cooler 113 and then is supplied again to the nozzles 111 of the cooling tower 110 by the pump 112. Here, in the cooler 113, a cold water 311 is used as a cold source of the cooling water 310 to be supplied to the cooling tower 110.

The exhaust gas 10, which contains the $CO_2$ and is cooled in the cooling tower 110, is sent from a tower top portion 110a of the cooling tower 110 to a tower bottom portion 120b of the absorption tower 120 via an exhaust gas line 114.

In the absorption tower 120, the $CO_2$ absorbing liquid 300 is supplied to nozzles 121 disposed in an upper portion of the absorption tower 120 and is sprayed downward in the absorption tower 120 from the nozzles 121. As the $CO_2$ absorbing liquid 300 is used, for example, an amine solution in which alkanolamine is a base component. The $CO_2$ absorbing liquid 300 is brought into countercurrent contact with the exhaust gas 10 rising up from the tower bottom portion 120b while passing through a packed bed 122 disposed in a space below the nozzles 121 in the absorption tower 120. In this way, the $CO_2$ in the exhaust gas 10 is absorbed by the $CO_2$ absorbing liquid 300, whereby the $CO_2$ is removed from the exhaust gas 10. Here, the exhaust gas 10 from which $CO_2$ is removed is called a clean gas 210. The clean gas 210 in which $CO_2$ is removed is exhausted from a tower top portion 120a of the absorption tower 120.

Here, when the $CO_2$ is absorbed from the $CO_2$ absorbing liquid 300, the $CO_2$ absorbing liquid 300 is heated and increased in liquid temperature, so that the clean gas 210 can contain water vapor and the like. In an upper portion of the absorption tower 120 are disposed a mist eliminator 123 and nozzles 124 which are disposed below the mist eliminator 123. The water vapor in the clean gas 210 is brought into countercurrent contact with a cooling water 320 sprayed from the nozzles 124 above the packed bed 122 in the upper portion of the absorption tower 120, thereby being cooled and condensed. The mist eliminator 123 is disposed above the packed bed 122 and collects mist in the clean gas 210. Outside the absorption tower 120 are disposed a cooler 127 and a pump 126 for recovering a part of condensed water 211 by a recovery tank 125 and for circulating the recovered condensed water 211 between the cooler 127 and the absorption tower 120 as a cooling water 320.

A $CO_2$ absorbing liquid 300R having absorbed the $CO_2$ (hereinafter referred to as "rich solution" in some cases) while passing through the packed bed 122 of the absorption tower 120 from above to below is stored in the tower bottom portion 120b. The stored rich solution 300R is fed into the regeneration tower 130 by a pump 151 through a liquid feed line $L_1$ for connecting the tower bottom portion 120b of the absorption tower 120 to an upper portion of the regeneration tower 130. Here, the liquid feed line $L_1$ is provided with a heat exchanger 152. In this heat exchanger 152, the rich solution 300R fed from the absorption tower 120 into the regeneration tower 130 to be described later exchanges heat with a $CO_2$ absorbing liquid 300L (hereinafter referred to as "lean solution" in some cases) regenerated and cooled by the regeneration tower 130, thereby being heated.

In the regeneration tower 130, nozzles 131 are disposed in its upper portion and the rich solution 300R heated in the heat exchanger 152 is sprayed downward from the nozzles 131.

A packed bed 132 is disposed below the nozzles 131. In the regeneration tower 130, $CO_2$ is emitted from the rich solution 300R by an endothermic reaction caused by a countercurrent contact when the rich solution 300R passes through the heated packed bed 132. By the time the rich solution 300R reaches a tower bottom portion 130b of the regeneration tower 130, the most portion of $CO_2$ is removed from the rich solution 300R, whereby the rich solution 300R is regenerated as the lean solution 300L.

Further, in the tower bottom portion 130b of the regeneration tower 130 is provided a circulation path $L_4$ for circulating a portion of the lean solution 300L to the upper portion of the tower bottom portion 130. The circulation path $L_4$ is provided with a reboiler 137. The reboiler 137 is provided with a steam pipe 137a for heating the lean solution 300L.

A portion of the lean solution 300L in the tower bottom portion 130b is supplied to the reboiler 137 through the circulation path $L_4$ and is heated by a heat exchange with the high-temperature steam passing through the steam pipe 137a and then is returned into the regeneration tower 130. By the thermal energy of the lean solution 300L heated in this way, $CO_2$ gas is further emitted from the lean solution 300L in the tower bottom portion 130b. Further, since the lean solution 300L is heated, also the packed bed 132 is indirectly heated. As described above, while the gas is in contact with the liquid in the packed bed 132, the $CO_2$ gas is emitted from the rich solution 300R.

In this way, the lean solution 300L having emitted $CO_2$ and regenerated in the regeneration tower 130 is returned to the absorption tower 120 by a pump 153 through a liquid feed line $L_2$ for connecting the tower bottom portion 130b of the regeneration tower 130 to the upper portion of the absorption tower 120.

The liquid feed line $L_2$ is provided with the heat exchanger 152 and a water-cooled cooler 154. The lean solution 300L passing through the liquid feed line $L_2$ exchanges heat with the rich solution 300R supplied to the regeneration tower 130 from the absorption tower 120 in the heat exchanger 152, thereby being cooled, and then exchanges heat with a cold water 311 in the water-cooled cooler 154, thereby being cooled to a temperature suitable for absorbing $CO_2$.

A $CO_2$ delivery line (delivery pipe) $L_3$ is connected to the tower top portion 130a of the regeneration tower 130. The $CO_2$ gas emitted from the rich solution 300R in the regeneration tower 130 is exhausted to the outside from the $CO_2$ delivery line $L_3$.

The $CO_2$ delivery line $L_3$ is provided with a cooler 140 using the cold water 311, a gas-liquid separator 141, and a $CO_2$ compressing device 145.

The $CO_2$ gas emitted from the regeneration tower 130 through the $CO_2$ delivery line $L_3$ is sufficiently cooled in the cooler 140 and then is fed to the gas-liquid separator 141.

In the gas-liquid separator 141, a condensed water 330 in the $CO_2$ gas cooled and condensed by the cooler 140 is separated from the $CO_2$ gas. The condensed water 330 separated in the gas-liquid separator 141 is returned to the upper portion of the regeneration tower 130 by a pump 143.

The returned condensed water 330 is spayed from nozzles 135 disposed in the upper portion of the regeneration tower 130 to a condensing portion 136 disposed below the nozzles 135, thereby cooling the $CO_2$ gas and cooling the condensing portion 136 to prevent the emission of an absorbent or the like.

In the $CO_2$ compressing device 145, the $CO_2$ gas having passed through the gas-liquid separator 141 is compressed. The compressed $CO_2$ gas is fed to a storage process through the $CO_2$ delivery line $L_3$ at the time of an ordinary operation.

In the present embodiment, a $CO_2$ gas return line (return pipe) $L_5$ for feeding the $CO_2$ gas into the absorption tower 120 is connected to an upstream side and a downstream side of the $CO_2$ compressing device 145 via opening/closing valves (switching parts) 160, 161.

The $CO_2$ gas return line $L_5$ can be disposed in such a way as to communicate with the interior of the absorption tower 120 at a position P1 above the nozzles 124 for spraying the cooling water 320 in the upper portion of the absorption tower 120.

Figure 2:
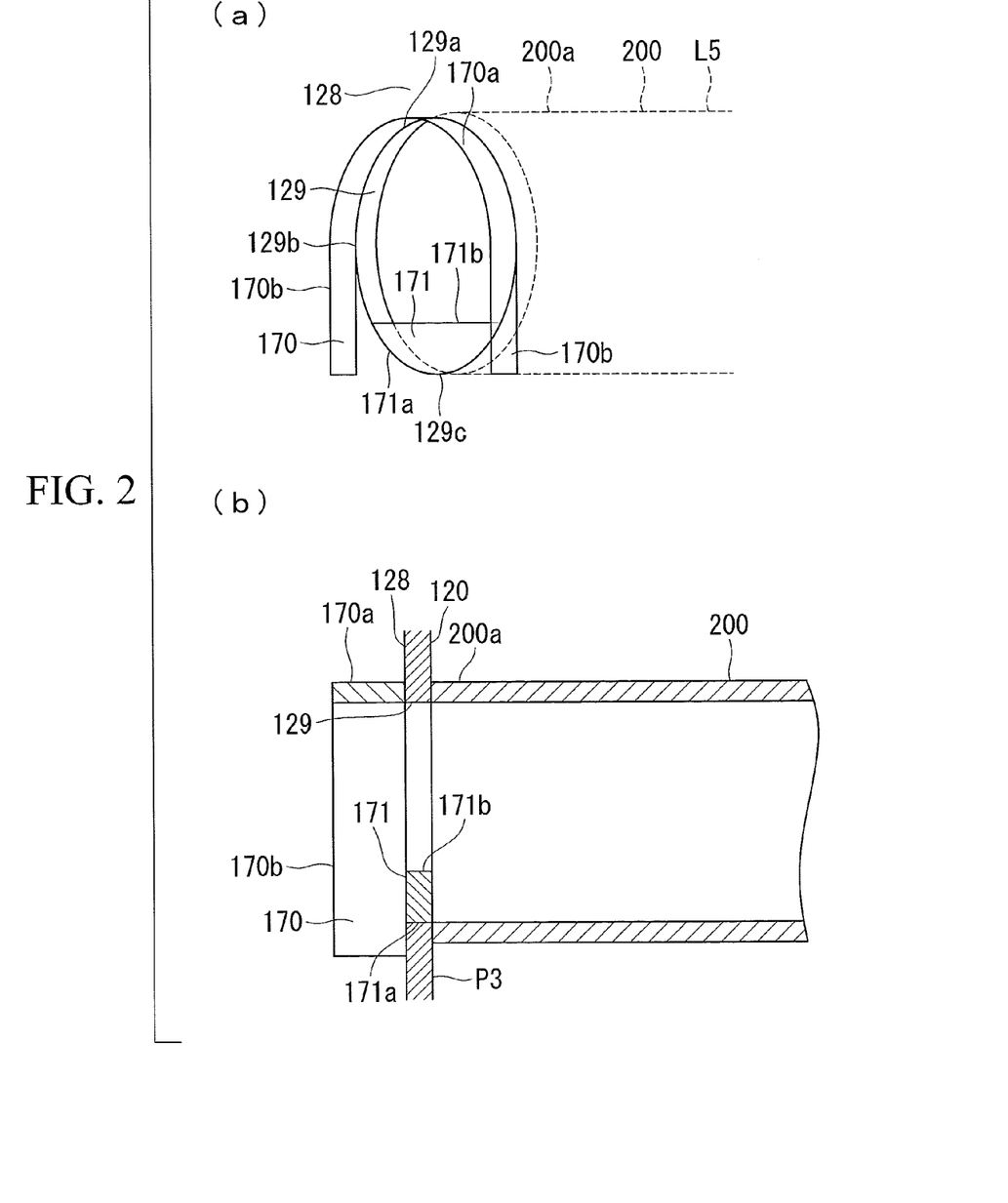
FIGS. 2A and 2B are a perspective view and a section view which respectively show a baffle plate and a cover disposed at an end portion of a return pipe.

As shown in FIG. 2, at the position P1, an end portion 200a of a pipe 200 communicating with the interior of the absorption tower 120 is connected to an outer peripheral side of an opening portion 129 formed in a wall body 128 of the absorption tower 120. The opening portion 129 is provided with a cover 170 and a baffle plate 171.

The cover 170 is formed nearly in the shape of an inverted letter U and is formed of: an upper curved wall portion 170a disposed along an upper half portion 129a of the circular opening portion 129; and lower side wall portions 170b, 170b extending downward in a vertical direction from both ends of the upper curved wall portion 170a positioned on both sides of a maximum width portion 129b of the opening portion 129.

At the position P1, the cooling water 320 flows down. By providing the opening portion 129 formed at the position P1 with the cover 170, it is possible to prevent the cooling water 320 from flowing into the pipe 200 from the opening portion 129.

The baffle plate 171 is disposed in such a way as to block a lower portion 129c of the opening portion 129 and is constructed of a curved portion 171a formed along an inner peripheral portion of the opening portion 129 and a straight portion 17ab for connecting both end portions of the curved portion 171a, and the curved portion 171a is welded to an inner peripheral surface of the lower portion 129c of the opening portion 129.

By providing the opening portion 129 formed at the position P1 with the baffle plate 171, it is possible to prevent the cooling water 320 splashed from below from flowing into the pipe 200 from the opening portion 129.

Further, as shown in FIG. 1, in the present embodiment, the $CO_2$ gas return line $L_5$ is branched in the middle and a branched drain line (return pipe) $L_6$ is disposed in such a way as to communicate with the interior of the absorption tower 120 at a position P3 above a portion in which the rich solution 300R is stored in the tower bottom portion 120b of the absorption tower 120.

The drain line $L_6$ is provided with a drain trap 165. The drain trap 165 recovers a liquid component contained in the $CO_2$ gas fed from the $CO_2$ compressing device 145.

The opening/closing valve 160 is operated in such a way as to be opened by a control part (not shown) when a gas pressure detected by a pressure sensor (not shown) on the upstream side of the $CO_2$ compressing device 145 is larger than a specified reference value.

The opening/closing valve 161 is operated in such a way as to be opened by a control part (not shown) when a gas pressure detected by a pressure sensor (not shown) on the downstream side of the $CO_2$ compressing device 145 is larger than a specified reference value.

In this way, when the gas pressure is larger than the specified reference value on the upstream side or the downstream side of the $CO_2$ compressing device 145, the $CO_2$ gas is returned to the absorption tower 120 through the $CO_2$ gas return line $L_5$ and the drain line $L_6$ and is mixed with the exhaust gas 10 in the absorption tower 120.

According to the construction described above, the $CO_2$ is absorbed and recovered from the exhaust gas 10 by the $CO_2$ absorbing liquid 300 in the absorption tower 120, and the $CO_2$ is taken out of the $CO_2$ absorbing liquid 300 in the regeneration tower 130. At the time of the ordinary operation, the taken-out $CO_2$ is delivered to the storage process. Further, when the $CO_2$ recovery unit 100 and the $CO_2$ compressing device 145 are activated, if some kind of trouble is caused on the storage process side and hence the storage process cannot receive the $CO_2$, the $CO_2$ gas is fed into the absorption tower 120 through the $CO_2$ gas return line $L_5$. In this way, the $CO_2$ gas can be mixed with the exhaust gas 10 (clean gas 210) and can be diffused into the atmosphere along with the clean gas 210.

This can eliminate the need for installing a vent stack and a duct to the vent stack and hence can greatly reduce an installation cost and an operation cost.

Further, since the $CO_2$ gas has a larger specific gravity as compared to the atmosphere, the $CO_2$ gas is hard to diffuse and hence is likely to collect in a lower portion as is in a place into which the $CO_2$ gas diffuses. On the other hand, when the $CO_2$ gas is mixed with the exhaust gas 10, the concentration of $CO_2$ in a mixed gas of the $CO_2$ gas and the exhaust gas 10 is decreased, so that when the mixed gas is diffused into the atmosphere from the tower top portion 120a of the absorption tower 120, the diffusibility of the $CO_2$ can be improved.

Still further, the $CO_2$ gas returned to the absorption tower 120 from the drain line $L_6$ is in contact with the exhaust gas 10 in the absorption tower 120 for a long time and hence can be well mixed with the exhaust gas 10, whereby the diffusibility of the $CO_2$ gas can be improved more reliably.

In this regard, in the embodiment described above, the $CO_2$ gas return line $L_5$ is disposed in such a way as to communicate with the interior of the absorption tower 120 at the position P1 above the nozzles 124 disposed in the upper portion of the absorption tower 120. However, the position in which the $CO_2$ gas return line $L_5$ is disposed is not limited to the position P1, and the $CO_2$ gas return line $L_5$ may be disposed at the other position.

For example, the $CO_2$ gas return line $L_5$ can be also disposed in such a way as to communicate with the interior of the absorption tower 120 above the mist eliminator 123 in the absorption tower 120.

Second Embodiment

Hereinafter, another embodiment of a carbon dioxide recovery unit relating to the present invention will be described.

Figure 3:
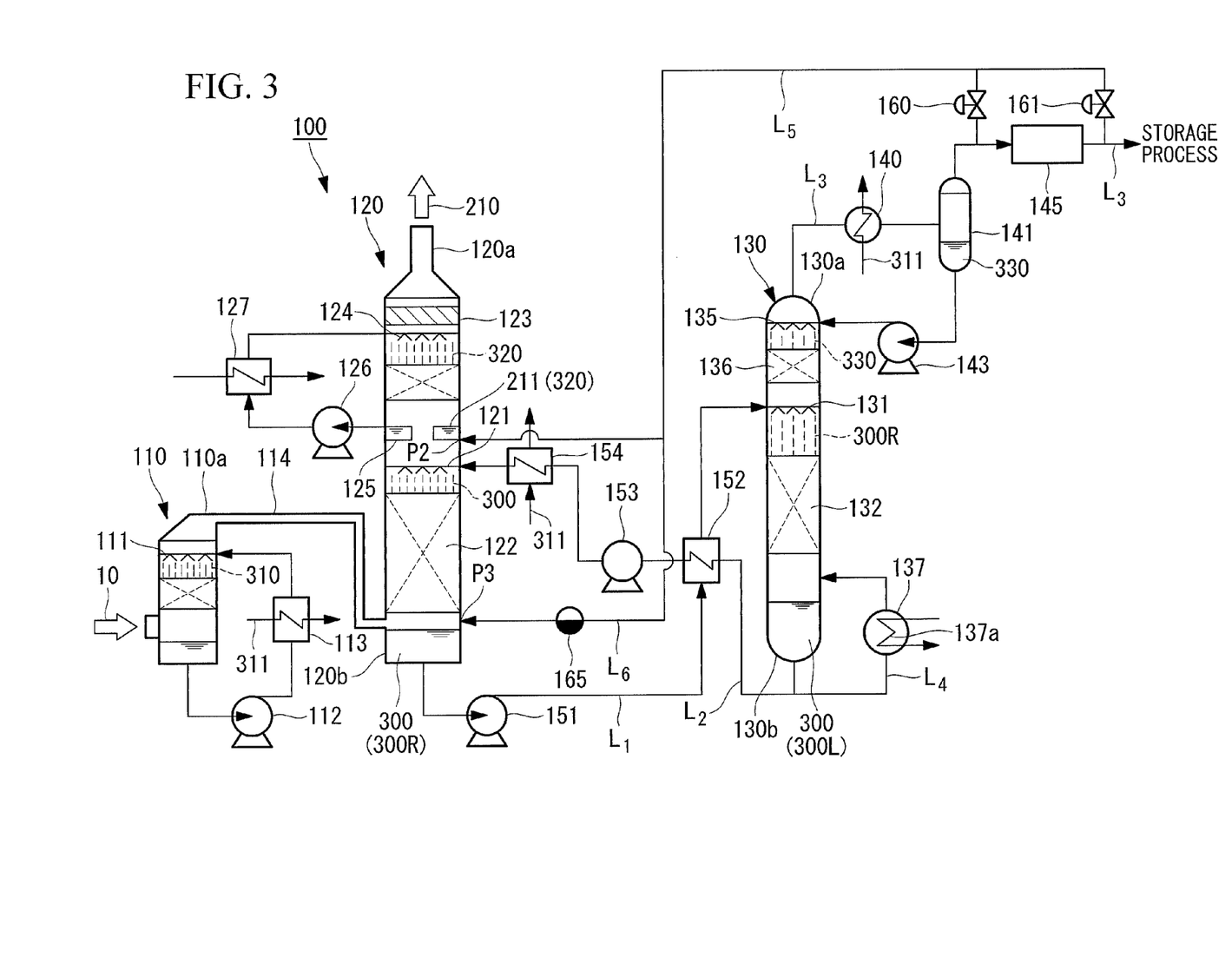
FIG. 3 is an illustration to show a construction of a $CO_2$ recovery unit relating to a second embodiment of the present invention.

Here, a second embodiment to be shown below is different from the first embodiment only in a position in which the $CO_2$ gas return line $L_5$ is connected to the absorption tower 120, so that the descriptions of the constructions common to the embodiment described above will be omitted.

As shown in FIG. 3, in the present embodiment, the $CO_2$ gas return line $L_5$ can be disposed in such a way as to communicate with the interior of the absorption tower 120 at a position P2 facing the recovery tank 125 for recovering a part of cooling water 320 sprayed from the nozzles 124 disposed below the mist eliminator 123 and a part of condensed water 211 dropped from the mist eliminator 123.

As shown in FIG. 2, the opening portion 129 formed at the position P2 can be also provided with the cover 170 and the baffle plate 171.

In this construction, the $CO_2$ gas is blown into water (recovered cooling water 320 and condensed water 211) in the recovery tank 125 from the $CO_2$ gas return line $L_5$, whereby a carbonated water is produced and the pH of cooling water 320 is reduced. Then, the carbonated water is sprayed into the absorption tower 120 as the cooling water 320 from the nozzles 124. Since the carbonated water is acid, when the carbonated water is brought into contact with an alkali amine vapor or mist of the $CO_2$ absorbing liquid 300, the amine vapor or mist can be captured and neutralized.

The clean gas 210 in which $CO_2$ is removed is exhausted from the tower top portion 120a of the absorption tower 120, and a part of amine solution is mixed into the clean gas 210. Hence, the employment of the construction described above can decrease pH of the cooling water 320 and hence can reduce the amine emission.

Here, the constructions shown in FIG. 1 to FIG. 4 may be combined with each other as required.

Further, the specific constructions of the regeneration tower 130 and the absorption tower 120 and the constructions of the other accessory facilities are not limited to the constructions described above but may be changed to the other constructions as required.

In addition, the constructions described above can be modified and omitted as required within the scope of the gist of the present invention.

REFERENCE SIGNS LIST 10 exhaust gas
100 $CO_2$ recovery unit
110 cooling tower
111 nozzle
112 pump
113 cooler
114 exhaust gas line
120 absorption tower
120a tower top portion
120b tower bottom portion
121 nozzle
122 packed bed
123 mist eliminator
124 nozzle
125 recovery tank
126 pump
127 cooler
128 wall body
129 opening portion
130 regeneration tower
131 nozzle
132 packed bed
135 nozzle
136 condensing portion
137 reboiler
140 cooler
141 gas-liquid separator
143 pump
145 compressing device
151 pump
152 heat exchanger
153 pump
154 water-cooled cooler
160, 161 opening/closing valve (switching part)
165 drain trap
170 cover
171 baffle plate
200 pipe
200a end portion
210 clean gas
211 condensed water
300 $CO_2$ absorbing liquid
300R rich solution
300L lean solution
310 cooling water
311 cold water
320 cooling water
330 condensed water
$L_1$ $CO_2$ feed line
$L_2$ $CO_2$ feed line
$L_3$ $CO_2$ delivery line (delivery pipe)
$L_4$ circulation path
$L_5$ $CO_2$ return line (return pipe)
$L_6$ drain line (return pipe)

The invention claimed is:

1. A carbon dioxide recovery unit comprising:
an absorption tower for bringing a $CO_2$ absorbing liquid of absorbing $CO_2$ into contact with an exhaust gas exhausted from a facility for burning fuel to thereby absorb the $CO_2$ contained in the exhaust gas;
a regeneration tower for emitting the $CO_2$ from the $CO_2$ absorbing liquid having absorbed the $CO_2$ in the absorption tower and for regenerating the $CO_2$ absorbing liquid;
a delivery pipe for delivering the $CO_2$ emitted in the regeneration tower to the outside;
a return pipe for feeding the $CO_2$ emitted in the regeneration tower to the absorption tower to thereby mix the $CO_2$ with a clean gas made by removing the $CO_2$ from the exhaust gas; and
a switching part for switching a destination part to which the $CO_2$ is delivered from the regeneration tower,
wherein when a pressure of the $CO_2$ in the delivery pipe is a specified level or more, the switching part switches a destination part to which the $CO_2$ is delivered from the regeneration tower from the delivery pipe to the return pipe.

2. A carbon dioxide recovery unit comprising:
an absorption tower for bringing a $CO_2$ absorbing liquid of absorbing $CO_2$ into contact with an exhaust gas exhausted from a facility for burning fuel to thereby absorb the $CO_2$ contained in the exhaust gas;
a regeneration tower for emitting the $CO_2$ from the $CO_2$ absorbing liquid having absorbed the $CO_2$ in the absorption tower and for regenerating the $CO_2$ absorbing liquid;
a delivery pipe for delivering the $CO_2$ emitted in the regeneration tower to the outside;
a return pipe for feeding the $CO_2$ emitted in the regeneration tower to the absorption tower to thereby mix the $CO_2$ with a clean gas made by removing the $CO_2$ from the exhaust gas; and
a switching part for switching a destination part to which the $CO_2$ is delivered from the regeneration tower,
wherein the return pipe feeds the $CO_2$ emitted in the regeneration tower into the absorption tower on a downstream side in a direction of flow of the exhaust gas to a region in which the $CO_2$ absorbing liquid is brought into contact with the exhaust gas in the absorption tower.

3. A carbon dioxide recovery unit comprising:
an absorption tower for bringing a $CO_2$ absorbing liquid of absorbing $CO_2$ into contact with an exhaust gas exhausted from a facility for burning fuel to thereby absorb the $CO_2$ contained in the exhaust gas;
a regeneration tower for emitting the $CO_2$ from the $CO_2$ absorbing liquid having absorbed the $CO_2$ in the absorption tower and for regenerating the $CO_2$ absorbing liquid;
a delivery pipe for delivering the $CO_2$ emitted in the regeneration tower to the outside;
a return pipe for feeding the $CO_2$ emitted in the regeneration tower to the absorption tower to thereby mix the $CO_2$ with a clean gas made by removing the $CO_2$ from the exhaust gas; and
a switching part for switching a destination part to which the $CO_2$ is delivered from the regeneration tower,
wherein an upper portion of an opening portion of the absorption tower having an end portion of the return pipe connected thereto is provided with a cover protruding inward of the absorption tower in order to prevent a cooling water from flowing into the return pipe from the opening portion, the cooling water flowing down from above in the absorption tower and cleaning and cooling the clean gas.

4. A carbon dioxide recovery unit comprising:
an absorption tower for bringing a $CO_2$ absorbing liquid of absorbing $CO_2$ into contact with an exhaust gas exhausted from a facility for burning fuel to thereby absorb the $CO_2$ contained in the exhaust gas;

a regeneration tower for emitting the $CO_2$ from the $CO_2$ absorbing liquid having absorbed the $CO_2$ in the absorption tower and for regenerating the $CO_2$ absorbing liquid;

a delivery pipe for delivering the $CO_2$ emitted in the regeneration tower to the outside;

a return pipe for feeding the $CO_2$ emitted in the regeneration tower to the absorption tower to thereby mix the $CO_2$ with a clean gas made by removing the $CO_2$ from the exhaust gas; and a switching part for switching a destination part to which the $CO_2$ is delivered from the regeneration tower, wherein a lower portion of an opening portion of the absorption tower having an end portion of the return pipe connected thereto is provided with a baffle plate for blocking a part of a lower portion of the opening portion in order to prevent a cooling water from flowing into the return pipe from the opening portion, the cooling water flowing down from above in the absorption tower and cleaning and cooling the clean gas.

5. A carbon dioxide recovery unit comprising:

an absorption tower for bringing a $CO_2$ absorbing liquid of absorbing $CO_2$ into contact with an exhaust gas exhausted from a facility for burning fuel to thereby absorb the $CO_2$ contained in the exhaust gas;

a regeneration tower for emitting the $CO_2$ from the $CO_2$ absorbing liquid having absorbed the $CO_2$ in the absorption tower and for regenerating the $CO_2$ absorbing liquid;

a delivery pipe for delivering the $CO_2$ emitted in the regeneration tower to the outside;

a return pipe for feeding the $CO_2$ emitted in the regeneration tower to the absorption tower to thereby mix the $CO_2$ with a clean gas made by removing the $CO_2$ from the exhaust gas; and a switching part for switching a destination part to which the $CO_2$ is delivered from the regeneration tower, wherein the return pipe is provided with a drain trap for recovering a liquid component contained in the $CO_2$ fed from the regeneration tower and a cooling water flowing into the return pipe from the absorption tower and for cleaning and cooling the clean gas.

* * * * *